United States Patent [19]

Giacopelli et al.

[11] Patent Number: 4,539,437
[45] Date of Patent: Sep. 3, 1985

[54] STORED PROGRAM POWER CONTROL SYSTEM FOR IMPROVING ENERGY EFFICIENCY FOR TELEPHONE SETS CONNECTED INTO A LOCAL TELEPHONE COMMUNICATIONS SYSTEM

[75] Inventors: James N. Giacopelli, Flanders, N.J.; James D. McElroy, Allentown, Pa.; Thomas M. Taylor, Flanders, N.J.

[73] Assignee: AT&T Bell Laboratories, Murray Hill, N.J.

[21] Appl. No.: 445,845

[22] Filed: Nov. 30, 1982

[51] Int. Cl.[3] .................... H04M 3/22; H04M 19/00; H04Q 3/54
[52] U.S. Cl. .......................... 179/18 ES; 179/18 AB; 179/99 M
[58] Field of Search ......... 179/18 BC, 18 ES, 18 AB, 179/18 FG, 99 M, 99 R, 81 B; 340/825.13, 825.12; 364/707

[56] References Cited

U.S. PATENT DOCUMENTS

| | | | |
|---|---|---|---|
| 3,668,289 | 6/1972 | Fenton | 179/18 BC |
| 3,855,577 | 12/1974 | Vandierendonck | 364/200 |
| 3,941,989 | 3/1976 | McLaughlin et al. | 364/707 |
| 4,056,689 | 11/1977 | Freimanis | 179/16 F |
| 4,061,887 | 12/1977 | Kasson et al. | 179/99 M |
| 4,109,113 | 8/1978 | Allison, Jr. et al. | 179/99 R |
| 4,125,748 | 11/1978 | Nahabedian et al. | 179/18 BD |
| 4,150,257 | 4/1979 | Fenton et al. | 179/18 BE |
| 4,150,259 | 4/1979 | Fenton et al. | 179/18 BC |
| 4,151,611 | 4/1979 | Sugawara et al. | 365/227 |
| 4,172,967 | 10/1979 | Porter et al. | 179/81 B |
| 4,279,020 | 7/1981 | Christian et al. | 364/900 |
| 4,400,584 | 8/1983 | Vilmur | 179/81 B X |
| 4,449,238 | 5/1984 | Lee et al. | 381/110 |

Primary Examiner—Thomas W. Brown
Attorney, Agent, or Firm—Alfred G. Steinmetz

[57] ABSTRACT

A stored program energy control system operates with the control of a telephone communications system to improve its energy efficiency by removing power from station sets and their associated visual indicators when they are inactive. Inactive station sets are identified by establishing minimal intervals of nonuse to define the inactive status. The energy control system responds to events like incoming calls and switchhook activity to restore power to the station set. Since energy is applied to a station set only when precisely needed, the overall energy drain of the system is greatly reduced.

12 Claims, 8 Drawing Figures

STORED PROGRAM POWER CONTROL SYSTEM FOR IMPROVING ENERGY EFFICIENCY FOR TELEPHONE SETS CONNECTED INTO A LOCAL TELEPHONE COMMUNICATIONS SYSTEM

TECHNICAL FIELD

This invention relates to an energy control arrangement for a telephone communications system, and more particularly, to an energy saving mode of operation of a communications system which improves the efficiency of operation.

BACKGROUND OF THE INVENTION

A telephone communications system is an on-site call processing system that interconnects a plurality of on-site telephone station sets to other on-site telephone station sets and to a plurality of lines connected to a central office or a private branch exchange. This call processing system generally operates under stored program control and provides a plurality of features to the user, including call forwarding, ability to hold a call, ability to add or drop lines from a conference call and in addition, the basic feature of allowing each station set user to originate and receive station-to-station calls.

To permit full use of these and many additional features of the communications system, the individual station set must provide the user with control access and with information as to its present operational status. This is normally accomplished by use of a multibutton electronic telephone station set having a plurality of push buttons which are used to select modes of operation and a plurality of visual indicator devices, associated therewith, serving to define the present operational status and the line selection.

These visual indicator devices and a DC-to-DC converter included in each station set are normally energized by DC electrical power supplied through the station set telephone line, and generally comprise two LED devices associated with each of the various control buttons of the station set. They are continuously active and consume power of approximately two watts with at least one LED device on, even though the station set is inactive or out of use for a considerable length of time. The most significant inactive period comprises overnight and weekend intervals during which a communications system in a typical business office is often inactive and unused.

In an era of rising energy costs, the dissipation of energy to continuously maintain visual indicator devices active and power inactive station sets during extended intervals of nonuse represents a considerable cost to the subscriber and yet, to deactivate the communications system during off hours to save energy is unacceptable since all stations are denied any off hours use. Given the energy cost reduction desirability and the need of providing continuous normal service to each station set, a practical energy saving control scheme for a communications system must have considerable flexibility to permit full station set service at all times.

A need for every station set in a telephone communication system to be simultaneously powered is an extremely rare event. Accordingly, the power level selected to be supplied may be chosen on the assumption that only a certain percentage of station sets will be used at any one time. However, in those instances where service demand exceeds that level, either the power source is overloaded and a substandard level of power is supplied to each station set or station sets are left to appear dead or malfunctioning with no indication that service is being temporarily denied.

SUMMARY OF THE INVENTION

A stored program energy control system in accord with the principles of the invention is included in a stored program controlled telephone communications system to improve energy efficiency by removing power from the station sets, the visual indicator devices and selected port card circuits during periods of inactivity of the telephone station sets. A scanning and count down routine of the control system identifies station sets that are inactive and disables the application of electrical power thereto. Inactive and de-energized station sets are periodically scanned for service request activity, an occurrence of which is responded to by the energy control system to reapply power to that station set. This energy control system further responds to incoming calls to immediately supply power to the addressed station set. Hence only active station sets are powered, leaving the inactive sets unpowered and thereby improving the overall conference system power efficiency.

With the energy control system in continuous operation, the unpowered state is the natural condition of each individual station set. Each station set remains in that unpowered state until the station set user initiates a service request or an incoming call activates the set. An alternative approach is to have all station sets fully active during normal business hours and utilizing the energy control system only during off hours and weekends.

A further feature of the invention operates to prevent overloading of the power source providing power to the station sets and the port cards associated therewith. According to this feature, once the power demanded by station sets and port cards in operation equals a predetermined power level limit, the application of power to additional station sets and port cards is denied until a presently powered station set becomes inactive. A small amount of power is retained in reserve for supplying an indicating or power busy signal to station sets denied power.

BRIEF DESCRIPTION OF THE DRAWING

An understanding of the operation and nature of this invention may be attained by reference to the following application and accompanying drawing in which.

DETAILED DESCRIPTION

Figure 1:
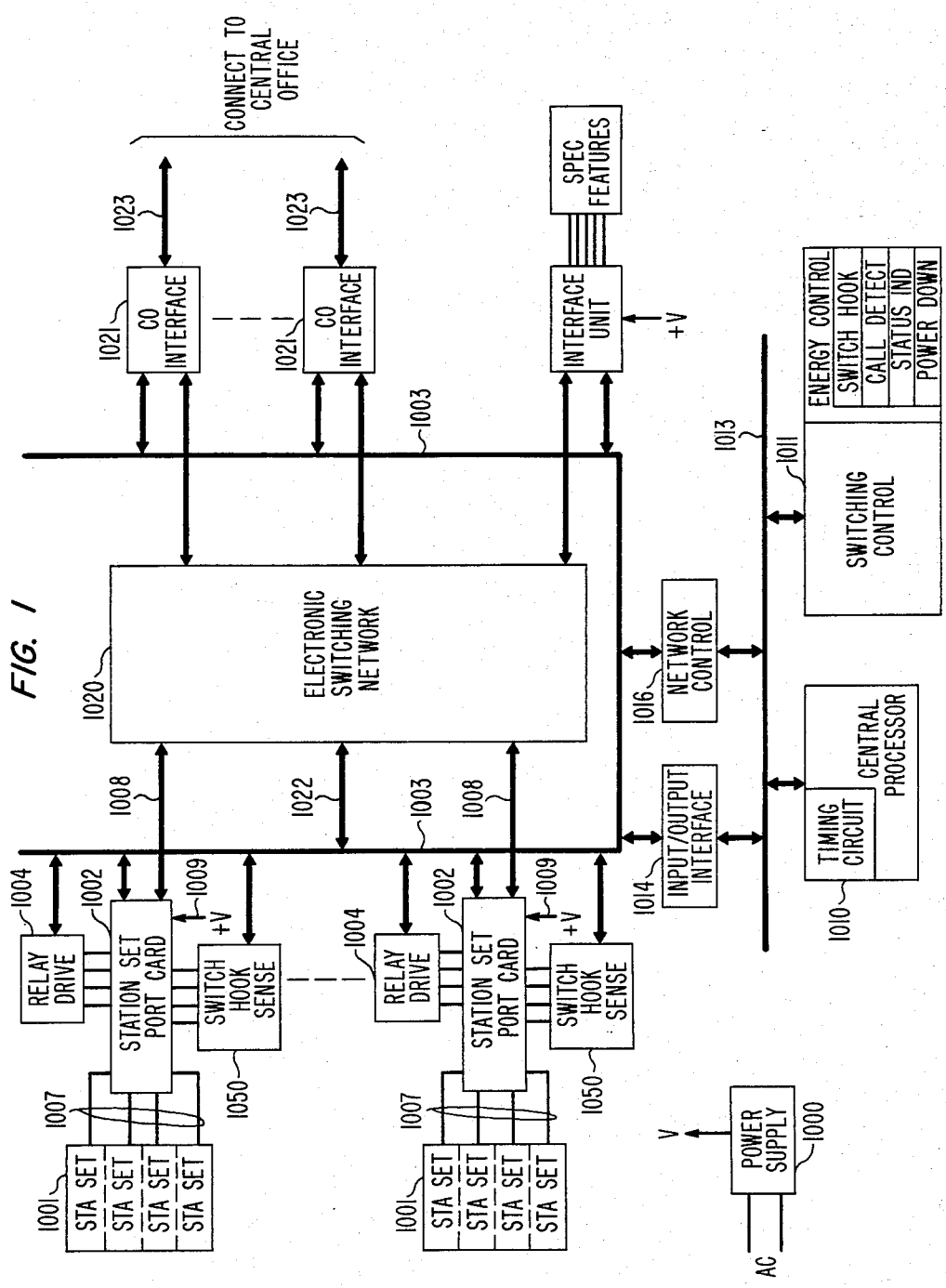
FIG. 1 shows a functional block schematic of a conference communication system servicing a plurality of multibutton electronic telephone station sets.

A telephone communications system coupling a plurality of individual telephone station sets to a central office or a private branch exchange is shown in FIG. 1. Such a communications system is controlled by instruction routines of a stored program control system to which the energy control instruction routines of the invention may be added or applied. This particular communications system shown in FIG. 1 in block diagram form combines key system telephone features such as line selection, visual status indication, etc. with many other features under control of instructions of the stored program.

A particular illustrative telephone communications system to which the instruction routines of the energy control system of the invention may be applied is disclosed in U.S. Pat. No. 4,109,113 issued Aug. 22, 1978 to C. E. Allison, Jr. et al; U.S. Pat. No. 4,125,748 issued Nov. 14, 1978 to C. E. Nahabedian et al; and U.S. Pat. Nos. 4,150,257; 4,150,259, both of which issued Apr. 17, 1979 to F. M. Fenton et al. These patents, assigned to the same assignee as this application, are all incorporated by reference herein for the description of a stored program controlled communications system having key telephone system features.

Control of call processing in this communications system is under the control of a microprocessor and a stored program in its associated memory system. Each telephone station set 1001 is connected to an interface or line port card circuit 1002, in fact, each line port circuit 1002 handles or services four telephone stations 1001. The port card circuit 1002 is an interface unit which responds to digital control signals on bus 1003, supplied by the central processor 1010, and enables connections between the station sets 1001 and an electronic switching network 1020. In addition, the line port card circuit 1002 includes power connections utilizing tip and ring leads to couple power from a power source to the station set. These power connections are under the control of a relay drive circuit 1004 operative to apply power to the telephone station sets 1001. Alternative means of controlling the application of power to individual station sets may include the use of power supplies mounted directly on the port card which are selectively activated by the central processor or the use of electronic switches in place of relay circuit cards.

Each station set 1001 is scanned through the line port card circuit 1002 to detect changes in status; for example, on hook, off hook, selection of a feature, etc. The memory 1011 of central processor 1010 includes switching control instructions in stored programs included in memory 1011 and translates these detected change of status signals into system commands.

Commands are also generated in response to the subscriber input to the multibutton electronic telephone station set itself. The command operations due to activation of the buttons are accompanied by actuation of the associated visual indicator devices which may be light emitting diodes. A face plate 202 of a typical multibutton electronic telephone set 201 is partially shown in FIG. 2. Each telephone station set 1001 is connected by wire pairs 1007 coming out of the station set 1001 and going to the line port card circuit or interface unit 1002. The line port card circuit 1002 interconnects the tip and ring leads 1007 of the station set to the electronic switching network 1020 and also provides coupling to a data link bus 1003 between the telephone set 1001 and the central processor 1010. The line port card circuit 1002 operates to transmit information from the telephone station set 1001 to the central processor 1010 which, in turn, controls the electronic switching network 1020 and also permits the sending of control signals back to the telephone sets 1001 to operate the particular feature desired and the associated visual indication signals.

The line port card circuit 1002 is also provided with special features which may be connected through the electronic switching network 1020 and through central office interface 1021 to a central office or private branch exchange.

Commands from the central processor 1010 to and from the various station sets are interconnected thereto by a main data bus 1003. Talking and signaling paths go from individual station sets 1001 through the individual port card 1002 via a signaling path 1008 to the electronic switching network 1020 and either to another station set or from thence via a signaling path 1023 through a central office interface 1021 to the central office or another private branch exchange. The central office interface cards 1021 are also connected to receive control signals from the main data bus 1003.

A central control or memory data bus 1013 is included for coupling the central processor 1010 to its memory 1011 and various input/output control circuits which are, in turn, connected to the main data bus.

The operation and control in response to the communications system and to external signals is determined by programmed instructions stored in the system memory 1011. Memory 1011 includes switching control routines and energy control routines. The system memory 1011 is coupled via a memory bus 1013 to a central processor 1010. The memory bus 1013 transfers information into and out of the processor and connects control signals to a variety of interface circuits including an input/output interface circuit 1014 and a network control circuit 1016.

In addition to receiving instructions from the memory 1011, the central processor 1010 receives input from various system sensors coupled via the main data bus 1003 and through the perhiperal circuits which interconnect the main data bus to the memory data bus 1013. The special techniques and details concerning the operation of these data busses and peripherals are well-known to those skilled in the microprocessor art and hence it is believed that these details need not be disclosed herein.

Input/output interface 1014 is a two-way data interface located between the main data bus 1003 and the memory data bus 1013. It performs such functions as coupling data from the memory data bus 1013 to the main data bus 1003. This interface circuit 1014 also includes station address registers and decoders which select and indicate the particular station set port cards 1002 and station sets 1001 to be operated by the central processor 1010. The input/output interface 1014 is connected via the data bus 1003 to the data inputs of the station set port cards 1002, each of which is connected to four individual telephone station sets 1001.

Each station set port card 1002 interfaces four multibutton electronic telephone station sets 1001 with the electronic switching network 1020 via connection 1008. This port card 1002 isolates the electronic switching network 1020 and the data processing circuitry electrically and provides a control powering arrangement by which a voltage applied to the port card 1002 is selectively enabled to be coupled to the station set 1001 in accord with the invention. This voltage is applied to the port card 1002 and coupled through the port card 1002 through controlled switching mechanisms thereon to selected station sets. These switches may be relays operated by a relay drive card, in turn, controlled by information supplied through the main data bus 1003, or the switches may comprise semiconductor switches.

All of the signaling between the station sets 1001 and the port cards 1002 and, eventually the central processor 1010, is performed digitally through the data bus 1003. Power to each individual station set is supplied from a voltage supply source via lead 1009 and a port card 1002 through a control relay and signal lines 1007 to the station set 1001 by phantom techniques. Phantom techniques are well-known to those skilled in the telephone art, and a detailed explanation is not necessary to explain this operation.

Talking paths are via the signal lines 1007 from each individual station set 1001 to the port card 1002 and subsequently through a signaling line 1008 to the electronic switching network 1020. Electronic switching networks are well-known in the telephone art and hence it is not believed necessary to disclose it in detail herein. The electronic switching network 1020 is also controlled in response to the central processor 1010 via the network control interface 1016. Signaling lines 1018 from the electronic switching network 1020 are connected through central office interface cards 1021 also controlled by the central processor 1020 through the main data bus 1003. The central office interface cards 1021 each of which handles four bidirectional lines are coupled to outgoing lines 1023 coupled, in turn, to a central office.

In operation, a control signal from the central processor 1010 is coupled through the network control interface 1001 which connects the memory data bus 1013 to the main data bus 1003. This process controls the switching network connections by sending control words over the memory bus 1013 and the switching data bus 1022 to cause selected connects and disconnects therein to occur.

Figure 2:
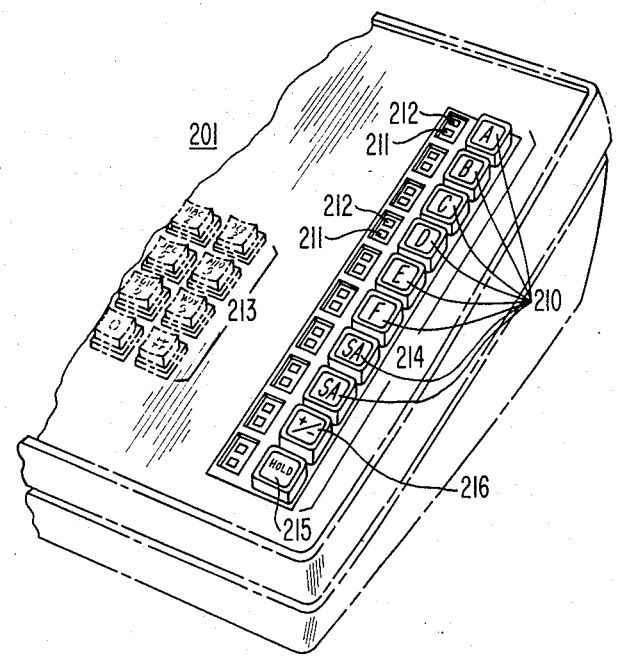
FIG. 2 shows a portion of a face plate of a typical multibutton telephone station set.

A typical front panel or face plate of a multibutton electronic telephone station set 201 as partially shown in FIG. 2 includes a multibutton electronic dialer 213, and a plurality of data selection and line selection buttons 214. Accompanying each of the selection buttons 214 are two visual indicator lights 211 and 212 embodied herein as light emitting diodes. These selection buttons 214 include system access buttons 210, a hold button 215, and a plus/minus button 216. System access buttons 210 are labeled to identify each set extension number in the conference system and provide lines through which both inside and outside calls may be connected. The system access buttons 210 may be used in combination with the other buttons to enable a variety of features, such as holding a call, adding parties to a call, dropping parties from a call, or transferring the call to another station. As indicated, each system access button has associated with it two light emitting diodes operating as visual indicators to indicate the status of a line selection or other status features. A complete explanation of the various features of the above described communications system may be found in the patents incorporated hereinabove by reference, and hence the detailed description therein need not be repeated.

The status indicator lights 211 and 212 have been continuously operated with the station set being continuously powered in the prior art versions of this communications system. This continuous operation represents a significant power dissipation, and in accord with the principles of this invention, a control instruction routine added to the memory 1011 operates through the switchhook sense cards 1050 and the relay drive cards 1004 of FIG. 1 to achieve a reduction in this energy dissipation in each of the individual multibutton electronic telephone station sets 1001. To this end, the energy saving control instructions interact with the actual status and operation of the communications system to selectively de-energize the visual status indicators, the selection buttons, and all associated circuitry within the multibutton electronic telephone sets during time intervals when their use is not essential. In particular, energy savings are achieved by controlling the phantom power applied to each multibutton electronic telephone station set 1001 and by also controlling power applied to the station set port cards 1002. Energy consumption is reduced by turning off any or both of these circuits when not needed to process calls. This turning off of energy supplied to these circuits is referred to herein as power down of the circuits. In contrast to continuously operate these station sets 1001, and port cards 1002 as in the prior art causes a considerable consumption of power. It has been found in the illustrative embodiment that powering down a station set 1001 when not in use saves two watts of input power. By powering down the associated station set port card 1002, an additional half watt can be saved.

The energy saving arrangement using the power down technique described herein does not interfere for practical purposes with normal operations of the conference communication system. The only apparent affect is the lack of visual status indicators and selection button response during nonoperation of the individual station sets 1001. Otherwise, all of the communications system features described in the patents incorporated herein by reference are fully retained and normal operation utilizing these features is available to each station set 1001. Hence if any one of the station sets 1001 connected to a port card 1002 requires power, its associated port card 1002 cannot be powered down unless all of the station sets, connected to a particular port card are inactive. Since each station set 1001 has a variety of needs, their power down state or the supply of power thereto is controlled on the basis of its individual needs. Where an auxiliary controller is added to supply energy control to an existing prior art communications system, as described hereinbelow with reference to FIG. 7, certain services to the station sets are granted a higher priority than other services. For example, power to a station set to receive an incoming call has the highest priority. The next priority is granted when it is necessary to energize a visual indicator on the station set to show the status of certain features of the communications system. A lessor priority requiring power is when a user goes off hook on a station set. This particular condition represents the lowest priority request for power; however, the response to the system is so fast compared to response times of human senses, that the normal ordering of these priorities in their effect is not apparent to the user.

Power down instructions are included in the overall energy control instructions included in the memory 1011 and are utilized by the control processor to achieve power savings. The power down or power processing instructions control the application of power to various port cards and station sets in order to limit power dissipation in the context of a normally operating conference communications system. The power down and energy control instructions recognize selected call activity, such as the station set switchhook state, incoming calls, and status information, to determine when it is necessary to reapply power to the appropriate port card 1002 or station set 1001 so that the features are continuously available for use at each station set.

The nature of this control system may be best explained by examining, in detail, the flow charts of the various control instructions included in the memory 1011 to control the processing of energy including power down within the communications system. The instruction routines to achieve energy efficiency include a main energy control loop, a specific power down routine to de-energize the station sets and port cards; a routine to detect switchhook activity at the individual station sets; a routine to detect incoming calls and a routine to apply power to energize the port cards and station sets. The normal state of a station set is its power down state. Switchhook activity and incoming calls re-energize the station set until a power down state resumes upon the completion of call activity. The latter three of these routines all re-energizes the station set from its normal powered down state while the first routine makes a decision to power down a station set.

Under direction of the instruction routines of the energy control arrangement, all the station sets 1001 are normally in a powered down condition until a use demand is generated. The instruction routine continually operates to either maintain a power down condition to sense a use demand and activate the station set. If a use demand results that a station set be powered, power is applied and control is returned to the normal instruction control of the central processor for normal switching and call processing.

Figure 3:
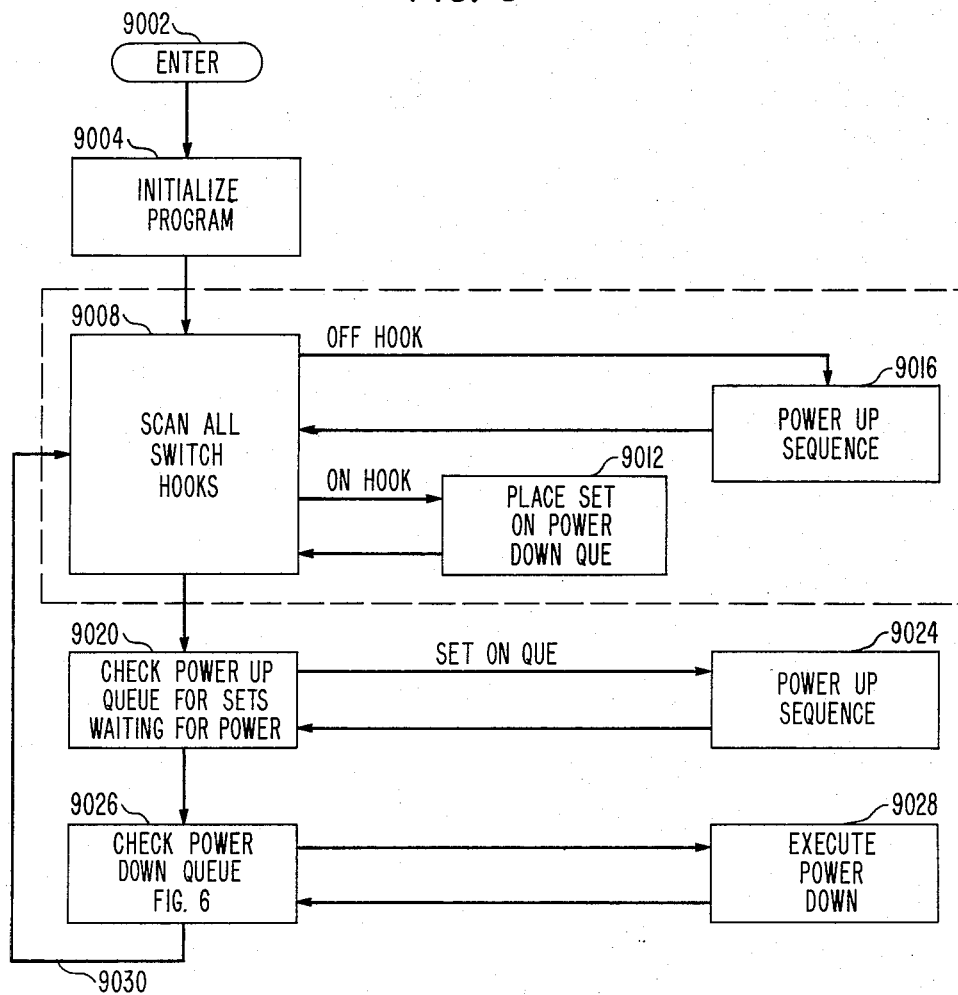
FIG. 3 shows a flow chart of an overall control scheme for optimizing the energy efficiency of a conference communication system.
Figure 5:
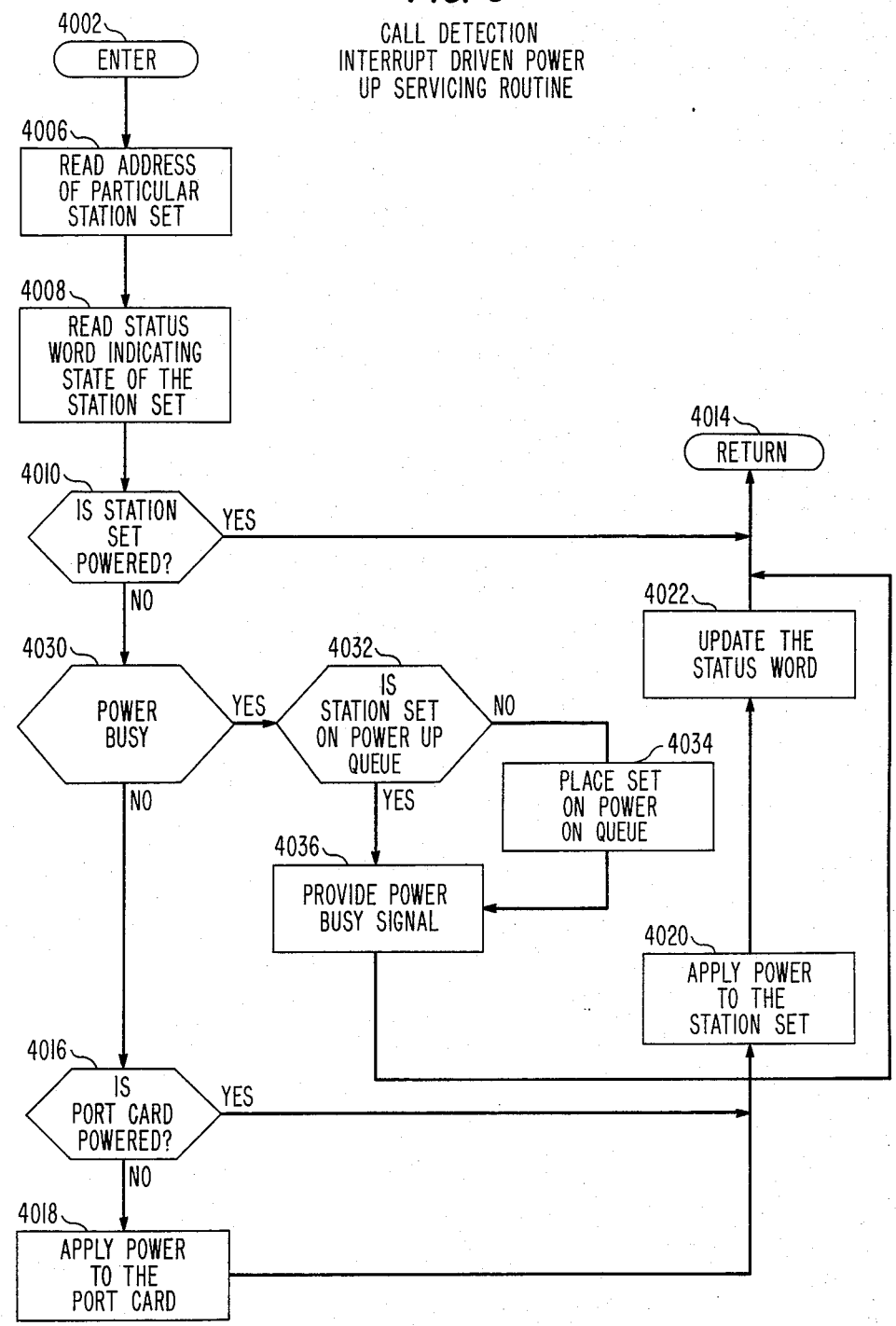
FIG. 5 shows a flow chart of an incoming call power sequence instruction routine.
Figure 6:
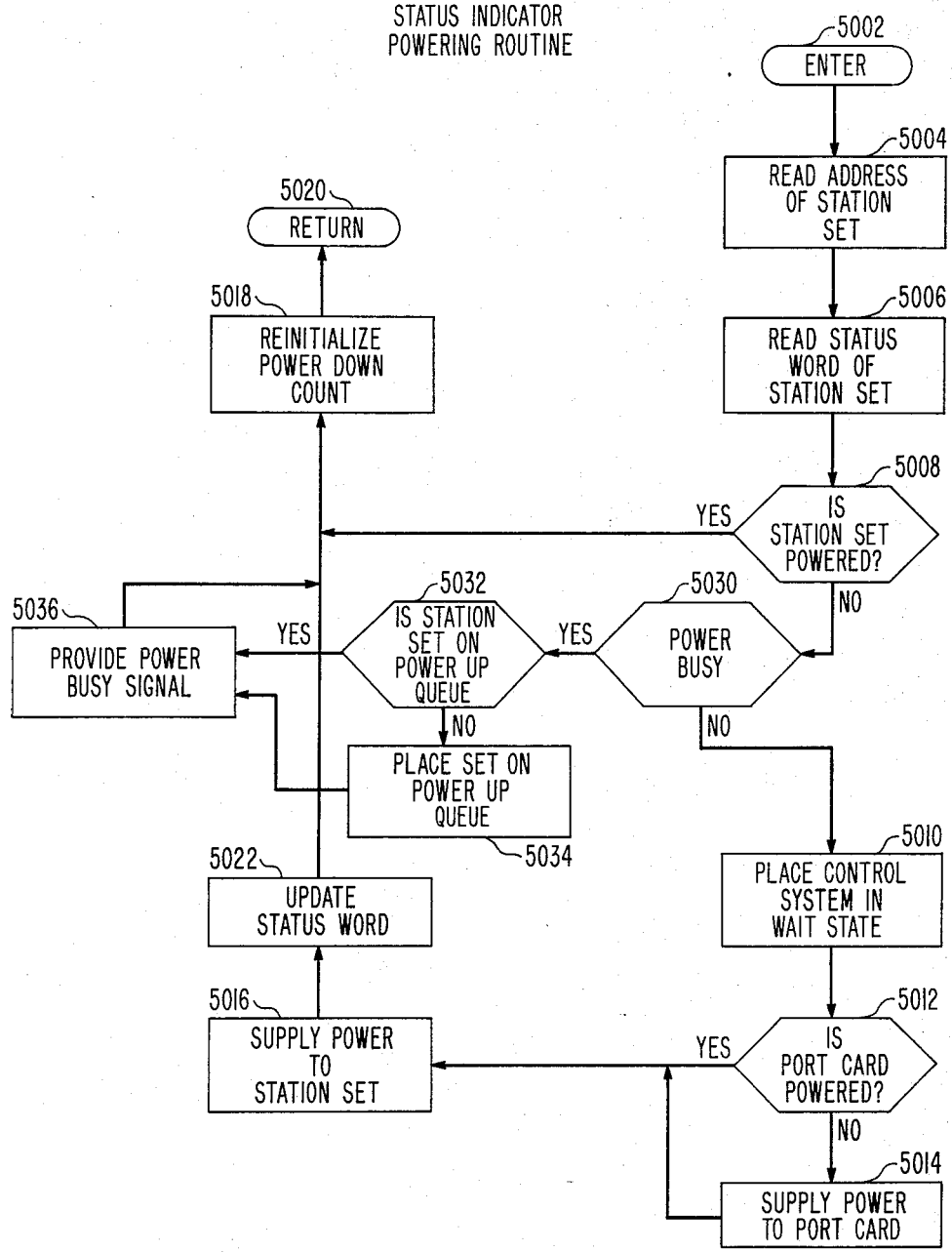
FIG. 6 shows a flow chart of a status indicator powering sequence instruction routine for station indicators.

The basic overall instruction routine flow chart for attaining improved power efficiency is shown in FIG. 3. This routine responds to conditions that result in power being applied to an individual station set or a particular port card, and it also performs a check that permits power down to be implemented. This instruction routine is normally entered in the terminal symbol 9002 or via interrupts generated by incoming calls as shown by the subroutine in FIG. 5 or by a need for multiple status indication as shown by the subroutine of FIG. 6. The instruction routine is initialized in process symbol 9004. This entails determining and entering into the routine preliminary factors such as the number of station sets in the communications system, the number of sets that can be adequately powered and similar information.

The instruction routine flow proceeds to process symbol 9008 whose instructions scan all station sets for a change in switchhook status (i.e., on hook to off hook and vice versa). In instances where a change from off hook to on hook is determined, the routine proceeds to process symbol 9012 which places the affected station set on a power down queue in which a routine described below evaluates the station set to see if it is appropriate to remove power from it. If a change from on hook to off hook has occurred, the routine proceeds to decision symbol 9016 which initiates a power-up sequence and determines if the capacity of the system power supply will be exceeded if this station set is supplied power. The functions performed in process symbols 9001, 9012 and 9016 are detailed in the switchhook scan routine shown in FIG. 4.

After completion of switchhook scan, the instruction routine proceeds to process symbol 9020 which identifies the station sets in a queue waiting for power up. These sets are powered up in a power-up sequence instruction in process symbol 9024.

The basic routine next investigates the station sets suitable for power down in process symbol 9026 and executes the power down in process symbol 9028. These functions are detailed in the routine of FIG. 6. Following process symbol 9026, the basic routine loops via flow line to process symbol 9008 and the whole routine is repeated.

Figure 4:
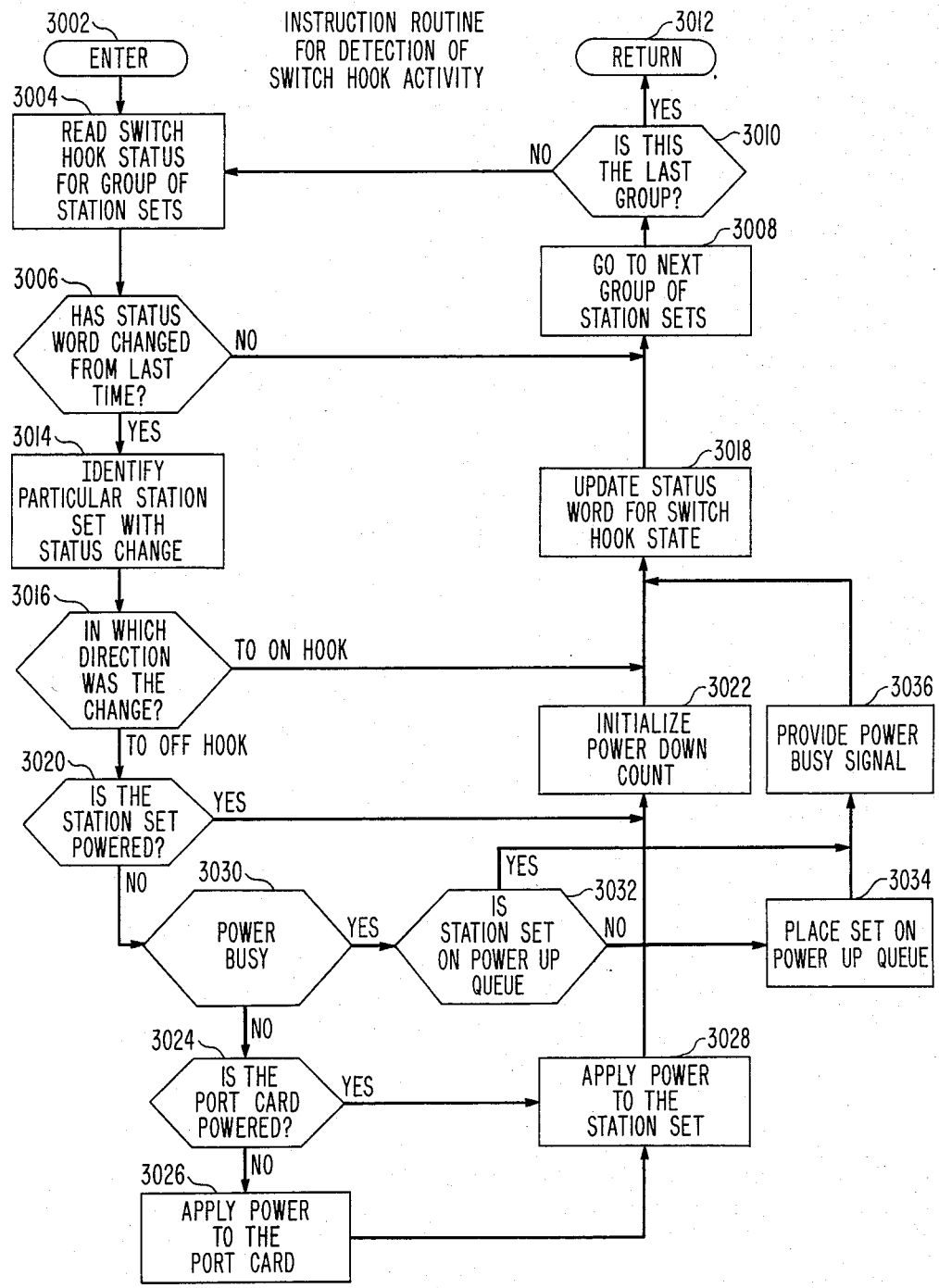
FIG. 4 shows a flow chart of a switchhook scan instruction routine.

A switchhook scan routine is disclosed in FIG. 4. This routine is executed by the central processor in the illustrative embodiment every 25 milliseconds and operates to scan the switchhook status of every individual station set 1001. Switchhook status is determined by scanning all of the switchhook sensor circuits 1050 shown in FIG. 1. These switchhook sensor circuits 1050 may comprise a voltage sensor to respond to the open circuit condition when the station set is on-hook. The switchhook scan routine is entered at terminal symbol 3002 in FIG. 4. Instructions according to process block 3004 cause the central processor to read the present on-hook or off-hook status of every station set in blocks of station sets associated with each switch sense circuit. The instruction routine proceeds to decision symbol 3006 whose instruction determines if the switchhook status of each and every station set has changed since it was polled during the previous run of the switchhook activity routine. If the decision is that no switchhook states have changed, the instruction routine proceeds to process symbol 3008, whose instruction directs that the next group of station sets be covered by a next switchhook scan circuit. The routine then proceeds to decision symbol 3010 whose instruction determines if the last group of station sets have been polled for off-hook. If such is the case, the instruction routine proceeds to terminal symbol 3012 and returns to the main routine of FIG. 3 and if not, the routine proceeds to process symbol 3004.

If a station set has gone off-hook, the instruction routine proceeds from decision symbol 3006 to process symbol 3014 whose instructions identify the particular station set whose status has changed. Instructions of the subsequent decision symbol 3016 determine if the change of the station set status has been from off-to-on-hook or from on-to-off-hook. If the transition has been from off-to-on-hook, the routine proceeds to process symbol 3018 whose instructions update a status word in memory indicating the switchhook status of each station set. If the transition has been from on-hook to off-hook, the instruction routine proceeds to decision symbol 3020.

Decision symbol 3020 represents instructions that determine if the station set just gone off-hook is powered. If it is already, the instruction routine proceeds directly to process symbol 3022 whose instructions are discussed below. If the station set is not powered, the routine proceeds to decision symbol 3030 whose instructions determine if powering this particular station set would cause the power output capacity of the power supply 1000 supplying voltage to the communications system in FIG. 1 to be exceeded. This evaluation of exceeding power capacity is termed herein as power busy, meaning that a preset power output capacity not to be exceeded would be exceeded if another power load is added. If power is not busy, the routine proceeds to decision symbol 3024 whose instructions determine if the port card, associated with the station set has been powered. If the port card is not powered, the routine proceeds to process symbol 3026 whose instructions direct application of power to the port card and from thence, the routine proceeds to process symbol 3028.

If the port cards are powered, the routine proceeds from decision symbol 3024 to process symbol 3028 whose instructions direct that power be applied to the station set. The instruction routine then continues to process symbol 3022.

The power down count referred to in process symbol 3022 is a count value maintained in memory for each station set. A station set, according to the program, must be on hook with a status indicator engaged to satisfy the initialization of the power down routine discussed below. The power down count assures that a certain timed interval of nonuse occurs before the set is powered down. The instruction of process symbol 3022 initializes the power down count to some value, then assumes that the station set will not be powered down until the power down count is fully decremented. After the power down count is initialized, the instruction routine proceeds via process symbol 3018 and 3008 to decision symbol 3010, which is discussed above.

If the power busy determination of decision symbol 3030 has indicated that power supply capacity is about to be exceeded, the routine proceeds to decision symbol 3032 to determine if the station set is on the power-up queue. If it is not, the process symbol 3034 instruction places it on the queue. The routine proceeds to process symbol 3036, following either a yes decision in decision symbol 3032 and following process symbol 3034, to provide a power busy signal to the off-hook station set to indicate to the user that service cannot be provided.

Incoming calls require that individual station sets be immediately re-energized. This is accomplished with the incoming call detector routine shown in FIG. 5. This routine is an interrupt driven routine which responds to the detection of an incoming call by the central processor controlling the electronic switching network. As soon as an incoming call is detected, this call detection routine is initiated as an interrupt routine and is entered at terminal symbol 4002. Subsequent instructions of process symbol 4006 identify the address of the station set recipient of the incoming call and the instructions of process symbol 4008 reads a status word indicating the operative state of that particular station set and which is presently contained in the memory. The status word is used by the instructions of decision symbol 4010 to determine if the station set is already powered. If the station set is already powered, the call detection routine is exited at terminal symbol 4014.

If the station set is not powered, the call detection routine proceeds to decision symbol 4030 which determines if sufficient power capacity is available to power the station set. If power capacity is not sufficient, decision symbol 4032 and process symbols 4034 and 4036 operate to provide a power busy signal to the station set and the routine continues directly to return terminal 4014. If available power capacity is sufficient, the detection routine proceeds to decision symbol 4016 whose instruction determines if the associated port card is powered. If the port card is powered, the routine proceeds to power the station set via the instruction of the process symbol 4020. If it is not, the port card is first powered by the instruction or process symbol 4018.

After the station set is powered, the instruction of process symbol 4022 updates the status word to indicate the current status of the newly powered station set. The call detection routine then proceeds via process symbol 4012 to the return terminal symbol 4014.

When a station set goes off hook or has an incoming call resulting in powering the station set or when some status LED must be energized to indicate a conference system feature such as message waiting or call forwarding, the appropriate visual indication must be powered to indicate status to the user. The instruction routine to power this visual indication is called by an interrupt signal responsive to the central processor applying power to the station set.

The first step of the status indicator routine shown in FIG. 6 is to identify the address of the individual station set activated as per process symbol 5004. Having identified the station set, its status word is read as directed by the instruction of process symbol 5006 and utilized in decision symbol 5008 to determine if the station set is powered or not. If it is, the instruction routine proceeds to process symbol 5018 whose instructions reinitialize the power down count and the instruction routine terminates at terminal symbol 5020.

If the station set is not powered, the instruction routine proceeds to decision symbol 5030 to determine if power supply capacity is sufficient to supply power to the station set. If power capacity is insufficient, a power busy signal is generated in response to instructions of process symbol 5036 and the routine proceeds to process and return symbols 5018 and 5020.

If the power supply capacity is sufficient, the control system is placed in a wait state by instructions of process symbol 5010 and instructions of subsequent decision symbol 5012 determines if the port card is powered. If it is not, power is supplied by the instruction of process symbol 5014 and the routine continues to process symbol 5016 as it does also if the answer to decision symbol 5012 had been yes. The instructions of process symbol 5016 supply power to the station set, and its status word is brought up to date in response to instructions of process symbol 5022 wherein the routine continues via process symbol 5018 to the terminal symbol 5020.

The chief objective of the energy control arrangement is to power down individual station sets whenever they are inactive. In the illustrative embodiment herein, a station set is powered down if it has been inactive for 5 seconds. An inactive station set is defined as a station set that is on-hook with only one status indicator light activated. The powering down of this station set is accomplished by the power down instruction routine shown in FIG. 7 which is part of the main routine of FIG. 3 and which operates once every 25 milliseconds to check every station set for inactivity.

Figure 7:
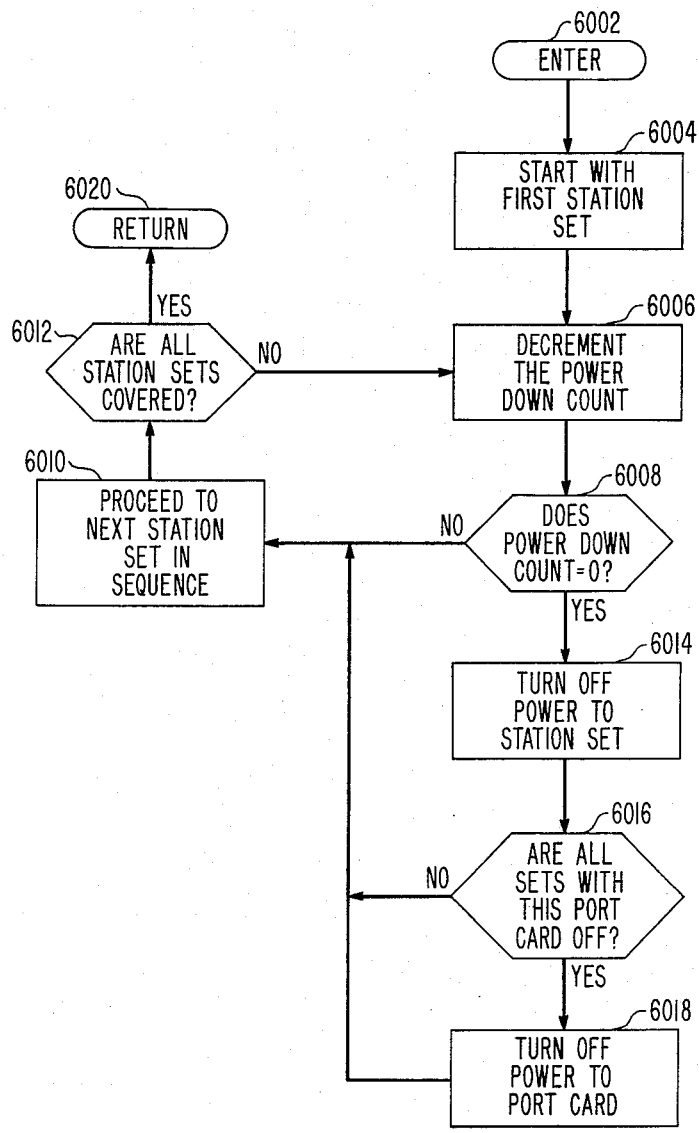
FIG. 7 shows a flow chart of a power down test sequence instruction routine.

The power down routine of FIG. 7 is entered at terminal symbol 6002 and proceeds to process symbol 6004 whose instructions call for monitoring of a first station set to determine if it is inactive. A subsequent instruction shown by process symbol 6006 decrements the power down count associated with that station set. As indicated above, the power down count associated with each station set is set by periods of activity and is periodically decremented by the routine to assure that a definite interval of inactivity has elapsed before it is powered down. The routine then proceeds to decision symbol 6008 whose instructions determine if the count down value is zero or nonzero; that is, whether the prerequisite interval of inactivity has elapsed.

If the power down count is not zero, the routine proceeds to process symbol 6010 whose instructions direct that the power down routine consider the next station set for power down consideration. Subsequent decision symbol 6012 inquires if all station sets have been considered; if not, the power down count in the next station set is decremented as instructed by process symbol 6006, and the routine proceeds to decision symbol 6008 as described above. If all the station sets have been covered, the routine is terminated at terminal symbol 6020.

If the instructions of decision symbol 6008 have determined a particular power down count to be zero, the subsequent instructions of process symbol 6014 turn off the power as applied to that particular station set. Instructions of subsequent decision symbol 6016 inquires if all station sets attached to the same port card are turned off. If they are, subsequent instructions of process symbol 6018 turn off power supplied to the port card. If the port card has powered station sets or after the process symbol 6018, the routine proceeds to process symbol 6010 whose activity has been discussed above.

It is apparent from the foregoing description that in the normal mode of operation, all station sets and all port cards are in a power down state until a demand for service occurs. This arrangement permits the powering down of this element of the system without significantly interfering with the normal operation of the telephone communication system. In a system embodying the invention comprising 15 station sets and 5 port cards, measurements indicated energy savings of up to 45% improvement over the standard operating energy drain.

Because of the substantial energy savings that can be achieved, it is desirable that these methods be applied to existing telephone communication systems that operate under a stored program control. Applications of these principles to an existing telephone communications system can be achieved by implementing power down control with an external processor acting in cooperation with the existing stored program control for the telephone system.

Figure 8:
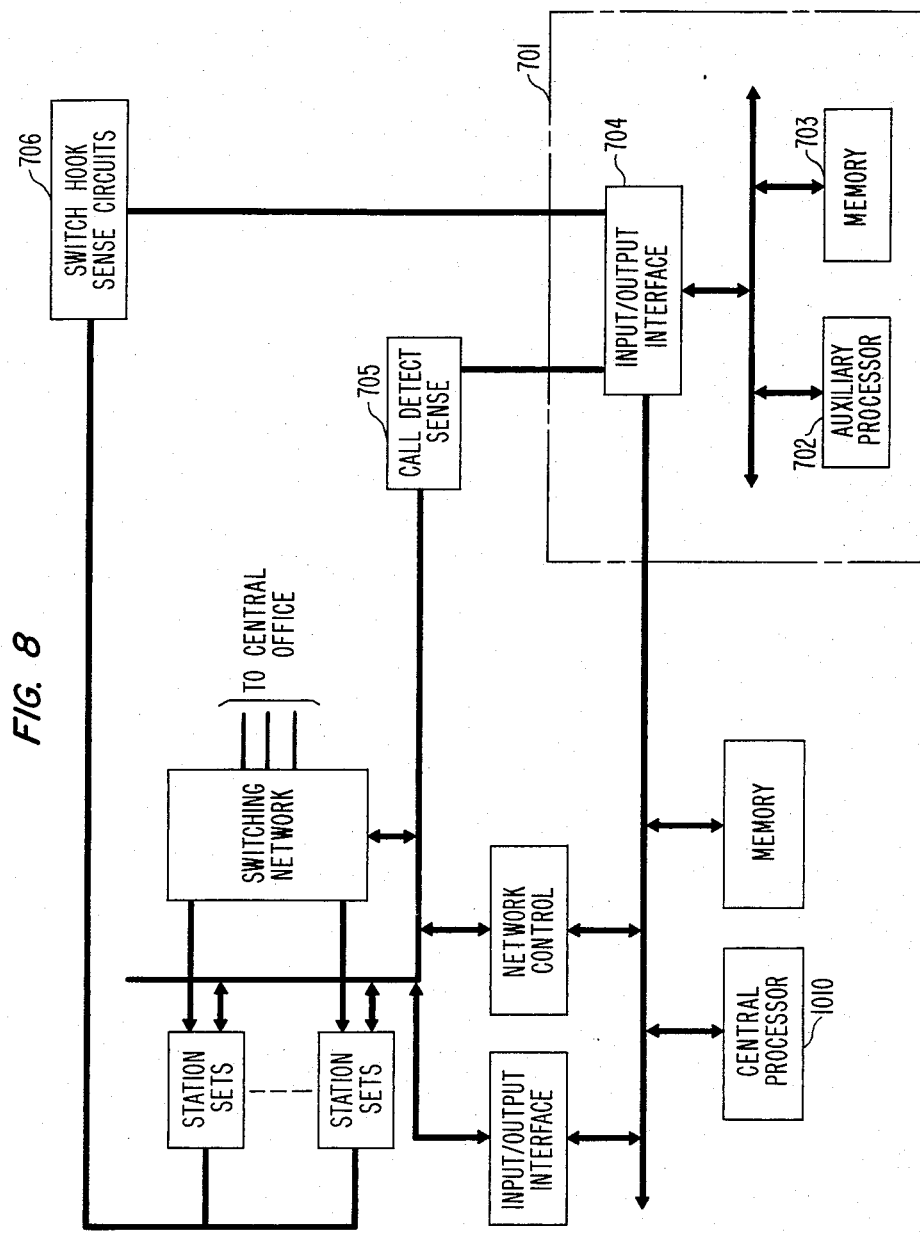
FIG. 8 shows an alternative block schematic arrangement of a conference communication system for applying the principles of the invention to an existing conference communication system utilizing an external energy control unit.

A control system permitting the implementation of power down control to an existing telephone communications system is shown in FIG. 8. In this telephone system, an auxiliary control 701 includes an auxiliary processor 702, memory 703 and interface 704. This interface is connected to the central processor 7010 of the control of the conference system and to a call detect sensor 705 and switchhook sensor 706. The call detect sensor 705 is coupled to receive signals responsive to incoming calls and provide an interrupt, the auxiliary processor 702 which puts the central processor in a wait state while the called station set is powered.

The memory 703 of the auxiliary control 701 includes the powering and power down instruction routines discussed above with reference to FIGS. 3, 4, 5, 6 and 7, which operate to effectively modify the operation of the conference system to achieve energy savings without effectively changing the operation of the central processor. When a power down or powering routine is called for, the central processor 7010 is placed in a wait state while the appropriate energy saving routines are being processed. Upon completion, control is returned to the central control of the conference system.

Since the central control of the conference system services all station sets sequentially, the circuitry controller must be synchronized to the central controller. Then synchronization is achieved by using timing signals of the central processor.

For example, the central control system will detect incoming calls and identify the address of the called station set, placing it on the central control bus. The auxiliary processor picks up the call detection signal of sensor 705 as an interrupt signal to initiate the call detection routine and the address from the bus is utilized to direct the application of power to the proper station set.

The detection of switchhook activity is accomplished by a series of switchhook sense circuits 706 which are coupled to a voice path of the station set to develop and on/off status signal. Station indication information follows call detection, and the central processor 7010 sends station information to the called station set. The auxiliary processor senses this information through sensor 706 to activate the station indication powering routine. Hence the energy savings routine of the invention may be applied to existing conference communication systems without the necessity of modifying their instruction routines.

What is claimed is:

1. An energy management system for a telephone communications system comprising;
   a switching network interconnecting a plurality of station sets to a central office, and
   a central controller for controlling the switching network and associated interface circuits and further including energy control means for controlling energizing of individual station sets,
   the energy control means comprising power down means for de-energizing inactive station sets,
   the power down means including:
   a first control means for establishing a count associated with each individual station set,
   a second control means for periodically investigating the count and decrementing it while the station set is inactive, and
   a third control means for de-energizing a station set when its associated count is fully decremented, and
   energizing means for restoring energy to de-energized station sets in response to indicia of activity.

2. An energy management system as defined in claim 1 wherein said energy control means comprises;
   means for detecting an incoming call and supplying energy to a called station set.

3. An energy management system as defined in claim 1 wherein said energizing means comprises;
   means for scanning station sets and detecting an on-to-off hook transition of an individual set and operative for supplying energy to the individual set.

4. An energy management system as defined in claim 1 wherein said energizing means comprises;
   means for recognizing a need for activating a plurality of station indicators at a particular station set and energizing that station set.

5. A telephone communications system having a plurality of individual station sets,
   means for enabling application of energy to each station set including a plurality of port cards, each port card coupled to individual groups of station sets, and a stored program control for the communications system comprising memory means including energy management instructions, said energy management instructions including:

a first set of instructions for determining an inactive station set and disabling an energy path through a port card to a station set connected thereto, a second set of instructions for identifying station sets needing energy and operative to activate a station set by enabling an energy path through a port card to a station set needing energy, and a third set of instructions for de-energizing a port card if all station sets coupled to that port card have been de-energized.

6. A telephone communications system as defined in claim 5 wherein said first set of instructions includes a routine to assign a count to an individual station set, a routine to periodically decrement the count when the individual station set is not in use and a routine to disable application of energy to the individual station set when the count equals zero.

7. A telephone communications system as defined in claim 5 wherein said second set of instructions include a routine for determining if application of energy to a station set will exceed a predetermined allowable energy level and operative to block application of energy to the station set if the allowable energy level would be exceeded.

8. A telephone communications system as defined in claim 5 wherein the communications system includes means to generate an interrupt signal in response to an incoming call to a station set that initiates operation of a routine of the second set of instructions to energize the station set.

9. A method of reducing energy dissipation in a telephone communications system including a plurality of station sets comprising the steps of identifying station sets that are presently inactive by polling all station sets sequentially to determine their status by, associating a power down count with each station set, and periodically decrementing the power down count when a station set is inactive, and identifying a station set as inactive when the power down count is fully decremented to some predetermined threshold count, removing power from station sets that have been determined to be inactive, and identifying station sets that have a need to be powered by responding to interrupts generated by service request actions, and restoring power to the station sets having a need to be powered.

10. A method of reducing energy dissipation in a telephone communications system as defined in claim 9 wherein the step of identifying station sets that have a need to be powered comprises the substeps of periodically scanning a switchhook condition of each station set and generating an interrupt when a switchhook scanned goes from on-to-off hook, responding to incoming calls to the telephone communications system, identifying a station set a call is directed to, and applying power to that station set.

11. A stored program power control system for improving energy efficiency by energy management for telephone sets connected into a local telephone communications system comprising:

a plurality of station sets subdivided into groups of station sets, a switching network, a plurality of port cards for interconnecting groups of station sets to the switching network, a central controller including a stored program control for controlling the switching network and for controlling energization of the port cards and station sets, the stored program control including energy management instructions comprising:

a first set of instructions for identifying inactive station sets by associating a count with each station set and decrementing the count as long as a station set is not in use, and de-energizing an inactive station set when a decremented count threshold is attained by disabling an energy path through a port card to the inactive station set, a second set of instructions for de-energizing a port card if all station sets coupled to that port card have been de-energized, and a third set of instructions for enabling an energy path through a port card and energizing a station set when it becomes active.

12. A stored program power control system as defined in claim 11 wherein the third set of instructions include a routine for determining if application of energy to a station set will cause total applied energy to all station sets to exceed an allowable level of energy and further operative to block application of energy to the station set if the allowable level of energy would be exceeded.

* * * * *